(12) United States Patent
Bayer (10) Patent No.: US 9,146,339 B2
(45) Date of Patent: Sep. 29, 2015

(54) METHOD AND APPARATUS FOR CONSTRUCTING A THIN FILM MIRROR

(71) Applicant: Barco N.V, Kortrijk (BE)

(72) Inventor: Jeffrey Bayer, Troy, OH (US)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 14/389,823

(22) PCT Filed: May 31, 2013

(86) PCT No.: PCT/US2013/043576
§ 371 (c)(1),
(2) Date: Oct. 1, 2014

(87) PCT Pub. No.: WO2013/181514
PCT Pub. Date: Dec. 5, 2013

(65) Prior Publication Data
US 2015/0092286 A1    Apr. 2, 2015

Related U.S. Application Data

(60) Provisional application No. 61/654,266, filed on Jun. 1, 2012.

(51) Int. Cl.
*G02B 7/188* (2006.01)
*G02B 5/10* (2006.01)
*G02B 26/08* (2006.01)
*B29D 11/00* (2006.01)
*B29K 105/00* (2006.01)

(52) U.S. Cl.
CPC ............ *G02B 5/10* (2013.01); *B29D 11/00596* (2013.01); *G02B 7/188* (2013.01); *G02B 26/0825* (2013.01); *B29K 2105/256* (2013.01); *B29K 2995/003* (2013.01)

(58) Field of Classification Search
CPC ...... G02B 7/188; G02B 5/10; G02B 26/0825; B29D 11/00596
USPC .......................................... 359/846–849, 883
See application file for complete search history.

(56) References Cited

U.S. PATENT DOCUMENTS

| 6,113,242 | A | 9/2000 | Marker et al. | |
| 2006/0049040 | A1* | 3/2006 | Tepman | 204/298.02 |
| 2006/0061750 | A1* | 3/2006 | Van De Ven | 355/72 |

FOREIGN PATENT DOCUMENTS

| EP | 1176447 | 1/2002 |
| EP | 1376193 | 1/2004 |

OTHER PUBLICATIONS

International Preliminary Report on Patentability dated Jun. 27, 2014 for corresponding application No. PCT/US2013/043576.
International Search Report and Written Opinion dated Sep. 9, 2013, for corresponding application No. PCT/US2013/043576.

* cited by examiner

*Primary Examiner* — Jennifer L. Doak
(74) *Attorney, Agent, or Firm* — Renner, Otto, Boisselle & Sklar, LLP (57) ABSTRACT

Systems and methods for constructing a thin film mirror are provided. The apparatus includes a vacuum chamber having edges. Adjacent the vacuum chamber is at least one extender having an edge that is spaced from and extending beyond the adjacent edge of the vacuum chamber in two directions. In this manner, the thin film does not contact the vacuum chamber until force is applied to the thin film, such as by mechanical tensioning mechanisms or application of a partial vacuum.

29 Claims, 8 Drawing Sheets

METHOD AND APPARATUS FOR CONSTRUCTING A THIN FILM MIRROR

This application is a national phase of International Application No. PCT/US2013/043576 filed May 31, 2013 and published in the English language.

FIELD OF THE INVENTION

The present invention relates generally to thin film mirrors, and particularly to methods for constructing thin film mirrors.

BACKGROUND

The use of thin film mirrors in large types of visual display apparatus is well known. Thus, for example, it is well known to use thin film mirrors of a concave near-spherical form in collimated displays for use in simulators. The simulators may be used for a wide variety of purposes including training (e.g., flight simulators), research, leisure and entertainment.

The thin film mirrors are usually constructed by fixing a film across an open face of an otherwise enclosed chamber. The edges of the chamber to which the film is attached lie on the surface of the desired mirror shape. In the case of simulator display apparatus, the mirror is usually part of a sphere which is bounded at its top and bottom by lines of latitude. Left and right hand ends of the mirror chamber may be lines of longitude or more complicated arrangements.

Standard methods of for making such mirrors involve lightly tensioning the film as it is applied such that it forms part of the frustum of a cone. The vacuum chamber is then partially evacuated, and the greater external air pressure forces the film into the desired mirror shape. The accuracy of the mirror shape may affect the quality of an image provided by the display apparatus utilizing the mirror. Various factors may affect the final shape of the mirror, including the characteristics of the chamber edges, the means by which the film is attached to the chamber edges, and manner in which the film stretches as the chamber is evacuated.

The present invention is directed to systems and methods for making improved film mirrors.

SUMMARY OF THE INVENTION

The present invention provides systems and method for constructing a thin film mirror. One or more extenders are used in conjunction with a vacuum chamber. More specifically, the extenders are adjacent the edges of the vacuum chamber and the extenders have edges extending beyond the edge of the vacuum chamber in two directions. For example, first and second extenders may be used and may be on opposing sides (such as the top and bottom) of the vacuum chamber. Accordingly, when a thin film is placed on the apparatus, and prior to subjecting the thin film to force, the edges of the extenders contact the thin film, but the edges of the vacuum chamber do not. As the thin film is subjected to force, such as by mechanical tensioning mechanisms or by application of a partial vacuum, the thin film is brought into contact with the edges of the vacuum chamber.

Accordingly, there are provided systems for constructing a thin film mirror. The apparatus includes a vacuum chamber having edges; a first extender adjacent the vacuum, the first extender having an edge, the first extender edge being spaced from and extending beyond the edge of the vacuum chamber in two directions; a second extender generally adjacent the vacuum chamber on a side opposing the first extender, the second extender having an edge, the edge being spaced from and extending beyond the edge of the vacuum chamber in two directions; wherein a line extending from the first extender edge to the second extender edge would not intersect the edges of the vacuum chamber.

According to another aspect, at least one of the first extender or the second extender has a generally L-shaped cross section such that when placed adjacent the vacuum chamber, the combination of the first extender or the second extender and the vacuum chamber may have a generally U-shaped cross-section.

According to another aspect, the end of at least one of the first extender or the second extender is not sealed.

According to another aspect, a sealed chamber is formed by the first extender and the vacuum chamber. In addition, each of the first extender edge and the second extender edge may include a generally flat mounting surface for mounting a thin film.

According to another aspect, each of the first extender and the second extender may be structurally rigid.

According to another aspect, the first extender edge may be adjustable with respect to the remainder of the first extender or the second extender edge may be adjustable with respect to the remainder of the second extender.

According to another aspect, the apparatus may further include at least one tensioning rod adjacent the vacuum chamber.

According to another aspect, the apparatus may further include at least one tensioning rod between the vacuum chamber edge and one of the first extender edge or the second extender edge. In addition, the apparatus may further include a plurality of tensioning devices adapted to apply force to the tensioning rod.

According to another aspect, at least one of the plurality of tensioning devices is adapted for fixation to at least one of the first extender or the second extender.

According to another aspect, the apparatus may further include a skinning attachment positioned on the side of the vacuum chamber with respect to the orientation of the thin film mirror and adapted to mate with the vacuum chamber, the first extender and the second extender. In addition, the skinning attachment may include a first set of film mount surface extensions corresponding to the first extender edge and the second extender edge, and a second set of film mount surface extensions corresponding to a first vacuum chamber edge and a second vacuum chamber edge.

According to another aspect the first extender edge and the second extender edge may be positioned along a generally circular arc. In addition, the first extender edge, the vacuum chamber edges and the second extender edge may be positioned along a generally circular arc.

According to another aspect, the first extender edge and the second extender edge may be positioned above and below the vacuum chamber with respect to the orientation of the thin film mirror.

According to another aspect, the first extender edge and the second extender edge may be positioned above and below the vacuum chamber with respect to the orientation of the thin film mirror.

According to another aspect, the apparatus may further include a clamp on the edge of the vacuum chamber adjacent the first extender or on the edge of the vacuum chamber adjacent the second extender.

According to another aspect, there is provided a thin film mirror constructed using the apparatus as described herein.

According to another aspect, there is provided a method for constructing a thin film mirror. The method may include providing a vacuum chamber having edges on opposing sides; providing an extender adjacent to the vacuum chamber on at least one of the opposing sides, the extender having an edge spaced from and extending beyond the edge of the vacuum chamber in two directions such that a line extending from the extender edge to the vacuum chamber edge on the side opposing the extender would not intersect the edge of the vacuum chamber adjacent the extender; securing a thin film to the extender edge; and applying force to the thin film between the extender edge and the adjacent vacuum chamber edge sufficient to bring the thin film into contact with the adjacent vacuum chamber edge.

According to another aspect, the method may further include providing a second extender adjacent to a side of the vacuum chamber opposing the extender, the second extender having an edge spaced from and extending beyond the edge of the vacuum chamber in two directions such that a line extending from the extender edge to the second extender edge would not intersect the vacuum chamber.

According to another aspect, the method may further include securing the thin film to the second extender edge. In addition, the method may including forming a sealed chamber by the vacuum chamber and the extender, wherein applying force to the thin film comprises applying a partial vacuum to the chamber formed by the vacuum chamber and the extender.

According to another aspect, applying force to the thin film may include using a tensioning rod.

According to another aspect, the method may further include using a plurality of tensioning devices to adjust the force of the tensioning rod on the thin film.

According to another aspect, the method may further include attaching a skinning attachment the side of the vacuum chamber with respect to the orientation of the thin film mirror such that the skinning attachment mates with the vacuum chamber and the extender.

According to another aspect, the method may further include applying a partial vacuum to the vacuum chamber. In addition, the method may further include using a plurality of tensioning devices to adjust the thin film after applying the partial vacuum.

According to another aspect, the method may further include clamping the thin film to the edge of vacuum chamber adjacent the extender edge.

According to another aspect, there is provided a thin film mirror constructed using the methods as described herein.

In addition, the apparatus and method described herein may improve stress pattern control of the thin film, minimize distortion of the desired shape of the thin film, and increase the viewable percentage of the film while decreasing the optical dead band zone.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 5b illustrates a cross-section view of the apparatus of FIG. 2a.

DETAILED DESCRIPTION

The present invention relates to systems and methods of constructing a thin film mirror. The inventive apparatus and method improve the ability to control film stresses, which facilitates proper thin film shape formation and maintenance. For example, a net spherical mirror shape may be more effectively achieved while minimizing the size and weight of the final mirror.

Standard methods for making thin film mirrors involve lightly tensioning the thin film as it is applied such that it forms part of the frustum of a cone. The vacuum chamber is then partially evacuated, and the greater external air pressure forces the film to stretch to transition from a cone shape to a sphere shape. In the vertical section, the film stretches from a straight line to a circular arc. In the horizontal section, the film stretches from a circular arc to a longer circular arc. However, the ability of the thin film to stretch is compromised where it is attached the edges of the vacuum chamber, preventing the film stretching parallel to the edge. Accordingly, the stretch is not uniform across the film. The reduced stretch near the edges of the film results in locally lower tension in the film, and a departure from the ideal shape. In vertical section, the film typically follows a "bathtub" curve, with a good curvature over the central region but changing curvature near the edges. The present invention improves upon such standard methods.

As used herein, "thin film" means any thin film that may be used to form the reflective optical surface of a mirror. For example, the thin film may be a metalized film, such as an aluminized polyester film.

Figure 1:
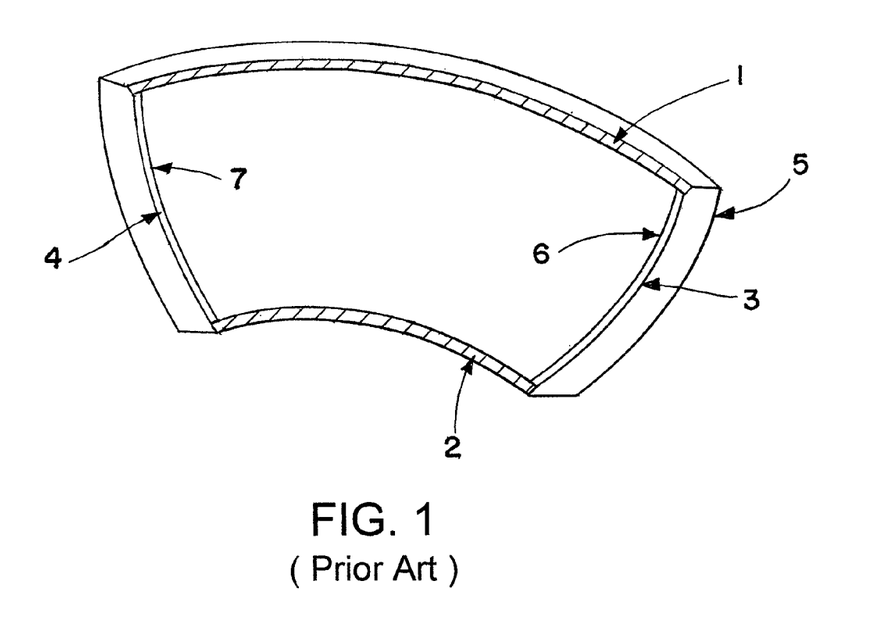
FIG. 1 illustrates a vacuum chamber.
Figure 5A:
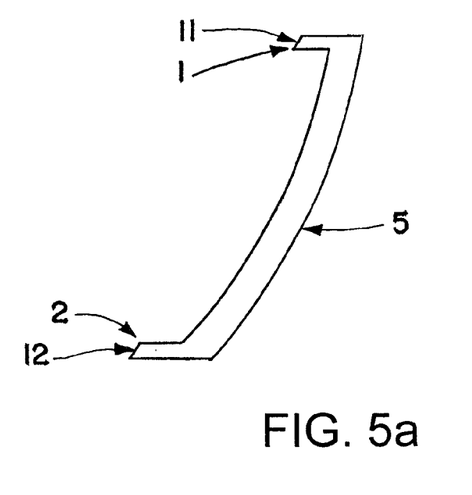
FIG. 5a illustrates a cross-section view of the apparatus of FIG. 1.

Turning initially to FIGS. 1 and 5a, there are provided perspective and cross-sectional views of a standard vacuum chamber 5. The vacuum chamber 5 may be a typical vacuum chamber as used in the prior art. The vacuum chamber 5 includes edges 1, 2, 3, 4 (e.g., form edges) that may define the shape of the thin film mirror. The edges 1, 2, 3, 4 include top edge 1, bottom edge 2 and side edges 3 and 4. Each of the edges includes a film mounting surface. Top edge 1 includes film mounting surface 11 and bottom edge 2 includes film mounting surface 12. Side edge 3 includes film mounting surface 6 and side edge 4 includes film mounting surface 7. The mounting surfaces 11 and 12 may be generally flat or slightly curved in shape. The top edge 1 and the bottom edge 2 may be designed such that the mounting surfaces 11 and 12 fit the shape of a generally circular arc.

Figure 2A:
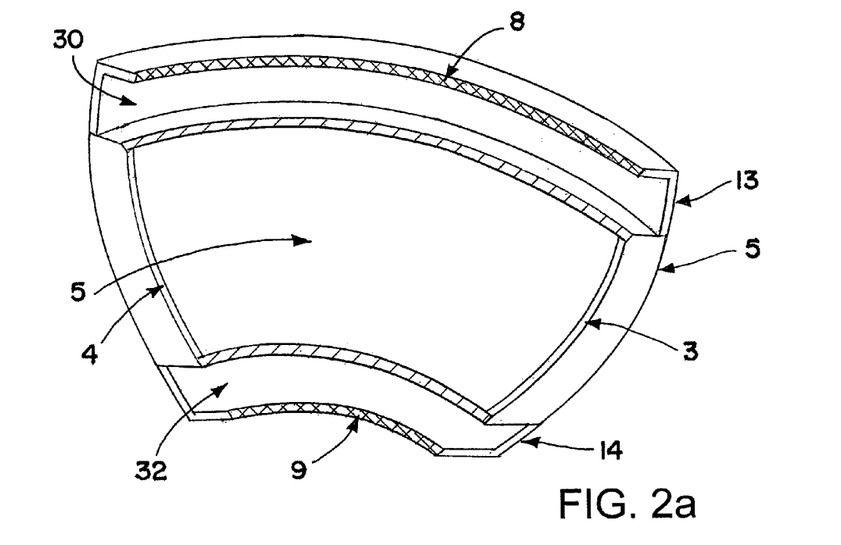
FIG. 2a illustrates a vacuum chamber in conjunction with extenders.
Figure 5B:
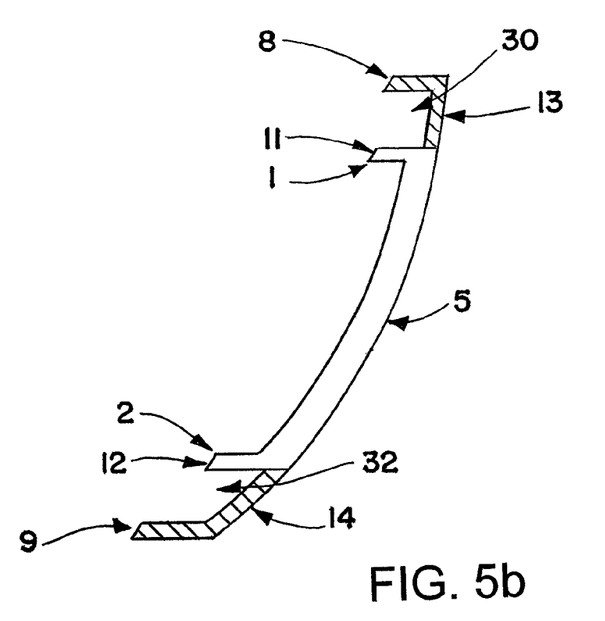

Turning next to FIGS. 2a and 5b, there are provided perspective and cross-sectional views of the vacuum chamber 5 with a first extender 13 and a second extender 14. Each of first extender 13 and the second extender 14 may be, but need not be, attached to the vacuum chamber 5 adjacent the edges 1 and 2, respectively. In addition, each of the first extender 13 and the second extender 14 may be permanently attached to, or integrally formed with, the vacuum chamber 5.

The first extender 13 includes an edge 8 (e.g., form edge) that may have a mounting surface, which may be generally flat or may be slightly curved, for mounting a thin film. As shown, the edge 8 is fixed with respect to the remainder of the first extender 13. It will be appreciated that the first extender 13 may be designed so that the edge 8 is adjustable with respect to the remainder of the first extender 13. As shown, the first extender edge 8 is spaced from and extends beyond the vacuum top edge 1 in two directions. More specifically, as best shown in FIG. 5b, the first extender edge 8 may spaced vertically and laterally from than the vacuum top edge 1. Due to such spacing in two dimensions, a line drawn between the first extender edge 8 and the vacuum bottom edge 2 would not intersect the vacuum top edge 1 adjacent the first extender 13. For example, the vacuum top edge 1, vacuum bottom edge 2 and the first extender edge 8 may configured such that they are positioned along a generally circular arc.

The second extender 14 includes an edge 9 (e.g., form edge) that may have a mounting surface, which may be generally flat or may be slightly curved, for mounting a thin film. As shown, the edge 9 is fixed with respect to the remainder of the second extender 14. It will be appreciated that the second extender 14 may be designed so that the edge 9 is adjustable with respect to the remainder of the first extender 14. As shown, the second extender edge 9 is spaced from and extends beyond the vacuum edge 2 in two directions. More specifically, as best shown in FIG. 5b, the second extender edge 9 may spaced vertically and laterally from than the vacuum bottom edge 2. Due to such spacing in two dimensions, a line drawn between the second extender edge 9 and the vacuum top edge 1 would not intersect the vacuum bottom edge 2 adjacent the second extender 14. For example, the vacuum top edge 1, vacuum bottom edge 2 and the second extender edge 9 may be configured such that they are positioned along a generally circular arc.

In addition, due to the spacing of the first extender edge 8 and the second extender edge 9, a line drawn between the first extender edge 8 and the second extender edge 9 would not intersect the vacuum top edge 1 or the vacuum bottom edge 2. In addition, the first extender edge 8 and the second extender edge 9 may be configured such that they are positioned along a generally circular arc. The vacuum top edge 1 and vacuum bottom edge 2 may be, but need not be, positioned along the same generally circular vertical arc as the first extender edge 8 and second extender edge 9.

Each of the first extender 13 and second extender 14 may have any suitable shape. In one embodiment, when the first extender 13 is adjacent the vacuum top edge 1, a partial chamber In one embodiment, each of the first extender 13 and the second extender 14 has a generally L-shaped cross section such that when adjacent to the vacuum chamber 5, the combination of either the first extender 13 or second extender 14 and the vacuum chamber 5 has a generally U-shaped cross section.

Also, the first extender 13 and vacuum chamber 5 when placed generally adjacent one another may form an extender chamber 30. Similarly, the second extender 14 and vacuum chamber 5 when placed generally adjacent one another may form an extender chamber 32. The extender chambers 30 and 32 may be open to the atmosphere or sealed. For example, the end of the first extender 13 or the end of the second extender 14 may be configured such that it is not sealed. Alternatively, the ends of the first extender 13 and second extender 14 may each form a sealed chamber in combination with the vacuum chamber 5, such as chambers 30 and 32.

Each of the first extender 13 and second extender 14 may be made from any suitable material (wood, metal, plastics, etc.). In addition, it may be preferable for the first extender 13 and the second extender 14 to be structurally rigid, at least in part, so that flexion of first extender edge 8 and the second extender edge 9 is minimized when the thin film is subjected to force or vacuum conditions.

Figure 2B:
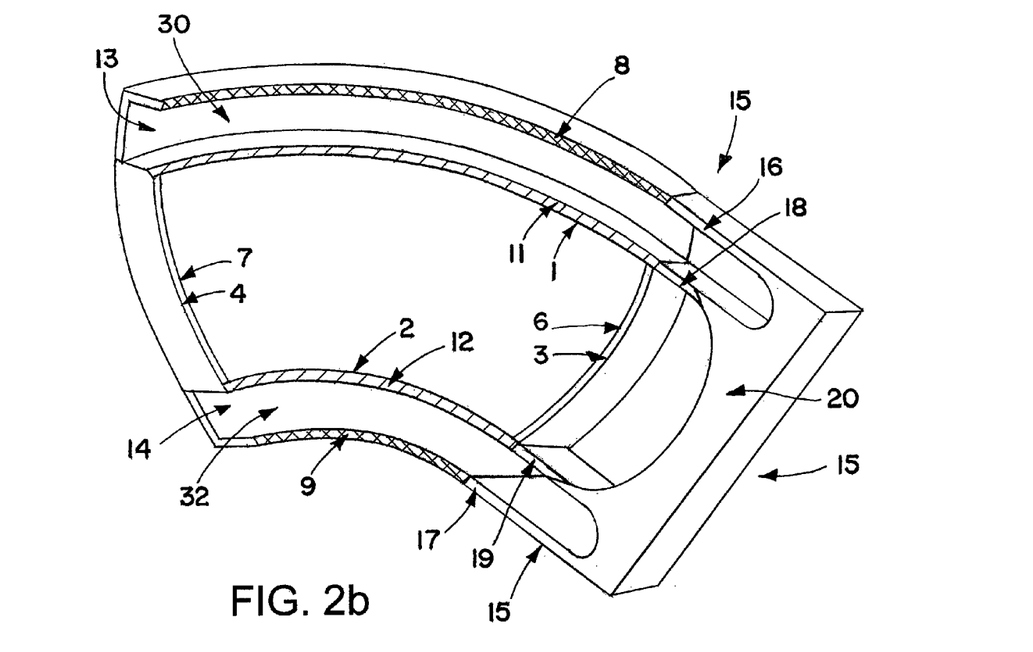
FIG. 2b illustrates a vacuum chamber in conjunction with extenders and a skinning apparatus.

Turning next to FIG. 2b, the use of skinning attachments is illustrated. As will be understood by those skilled in the art, "skinning" is a term that refers to the process of attaching a thin film to the vacuum chamber 5 and manipulating the thin film to achieve a desired shape and stability. As shown in FIG. 2b, the skinning attachments 15 are lateral attachments to the vacuum chamber 5, first extender 13 and second extender 14 that aid in the skinning process. The use of skinning attachments (sometimes referred to in the art as "skinning ears"), such as skinning attachments 15, is known. Skinning attachments are typically placed on opposing sides of a vacuum chamber (e.g., opposing lateral sides) and typically are removed from the vacuum chamber at the completion of the skinning process. Some vacuum chamber designs, however, include permanent structures that function in the same manner as skinning attachments.

Referring to FIG. 2b, skinning attachments 15 may be attached to opposing lateral ends of the vacuum chamber 5 (FIG. 2 illustrates one of the two skinning attachments). Each skinning attachment 15 may have two sets of film mount surface extensions 16, 17, 18, 19. The first set of film mount surface extensions 16, 17 may correspond to the first extender edge 8 and the second extender edge 9. For example, the first set of film mount surface extensions 16, 17 may be are aligned with a mounting surfaces of the first extender edge 8 and the second extender edge 9, respectively. Likewise, the second set of film mount surface extensions 18, 19 may correspond to the vacuum top edge 1 and vacuum bottom edge 2. For example, the film mount surface extension 18 may be aligned with a mounting surface 11 of the vacuum top edge 1 and the film mount surface extension 19 may be aligned with a mounting surface 12 of the vacuum bottom edge 2. During the skinning process, untensioned or lightly tensioned thin film may be held in contact the front surface 20 of the skinning ear 15 and also with the first set of film mount surfaces extensions 16, 17.

Figure 6:
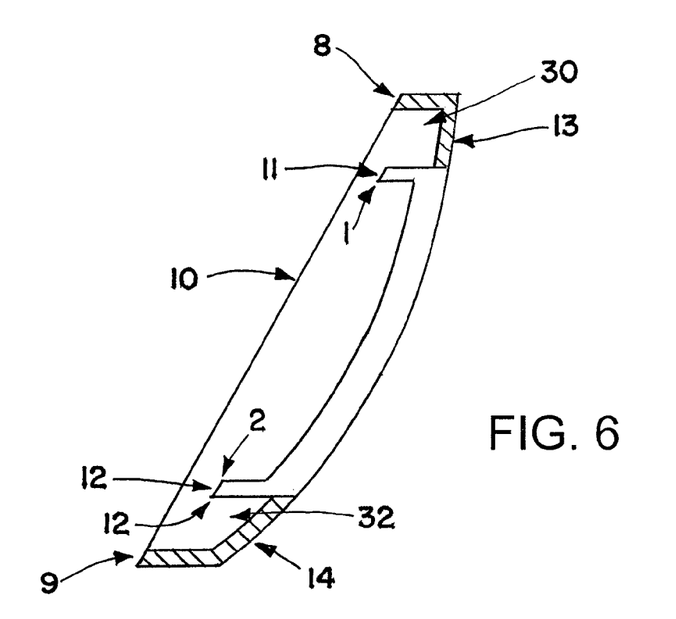
FIG. 6 illustrates a cross-section view showing the placement of a thin film on the apparatus of FIG. 5b.

Turning next to FIG. 6, placement of the thin film 10 on the apparatus is illustrated. As shown, the apparatus includes a first extender 13 and a second extender 14. The thin film 10 may be placed so that it is in contact with the first extender edge 8 and the second extender edge 9. In an untensioned or lightly tensioned state, the thin film 10 is not in contact with the vacuum chamber 5, including the vacuum chamber edges 1 and 2. It will be understood, however, that while not shown, the apparatus may be configured such that only one extender (e.g., the first extender 13) is used. Thus, the thin film 10 could be brought into contact with the first extender edge 8 and the vacuum bottom edge 2. Similarly, the thin film 10 could be brought into contact with the second extender edge 9 and the vacuum top edge 1 in the instance where only the second extender 14 is used. The thin film 10 may be secured to the surface to which it is brought into contact using standard techniques.

Figure 3A:
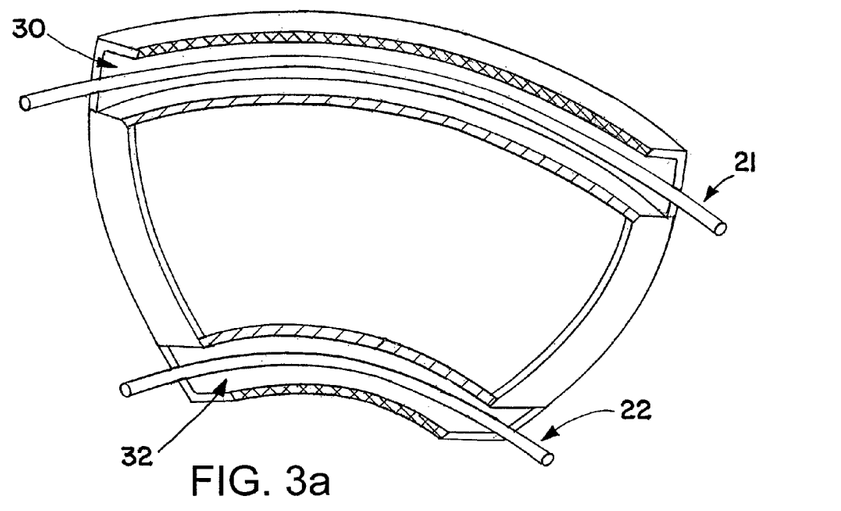
FIG. 3a illustrates the placement of tensioning rods with respect to the vacuum chamber and extenders.
Figure 3B:
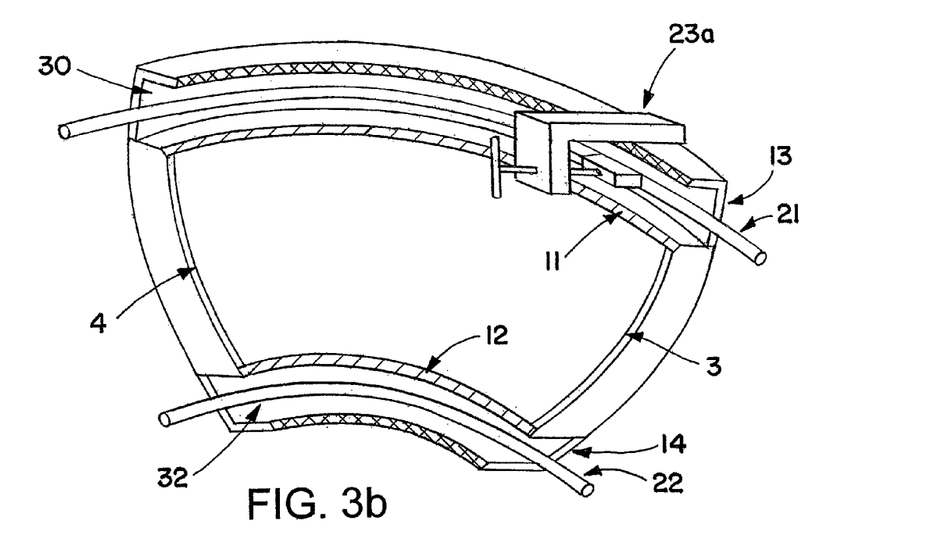
FIG. 3b illustrates the use of a tensioning device with a tensioning rod.
Figure 7:
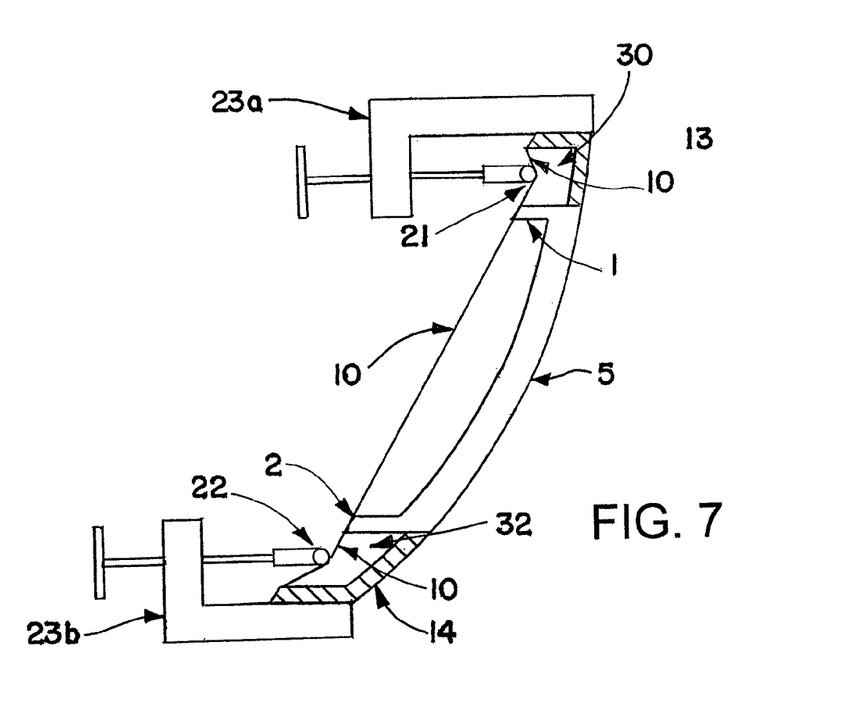
FIG. 7 illustrates a cross-section view of the use of a tensioning rod and a tensioning device in conjunction with the apparatus of FIG. 5b.

Once the untensioned or lightly tensioned film is secured, such as to the first extender edge 8 and the second extender edge 9, one or more tensioning rods and tensioning devices may be used to apply force to the thin film 10, thereby causing it to stretch. As used herein, a tensioning rod is any structure suitable for use in applying force to the thin film at a selected location. FIGS. 3a-b and 7 illustrate an exemplary use of tensioning rods and devices with the vacuum chamber 5, first extender 13, second extender 14 and thin film 10. For simplicity, the skinning attachment 15 is not shown. As shown, a tensioning rod 21 may be positioned such that it can be used to force the thin film 10 towards the vacuum top edge 1. For example, the tensioning rod 21 may be positioned to force the thin film 10 into the first extender chamber 30 formed by the first extender 13 and vacuum chamber 5. Accordingly, the tensioning rod 21 may be positioned adjacent the vacuum chamber 5 and, more specifically, between the vacuum top edge 1 and the first extender edge 8. Alternatively, the tensioning rod 21 may be positioned between the vacuum top edge 1 and vacuum bottom edge 2, or the tensioning rod 21 may be positioned directly in line with the vacuum top edge 1.

A plurality of tensioning devices 23a may be used to apply force to the rod 21, thereby causing the rod 21 to apply force to the thin film 10. FIGS. 3b, 7, 8 and 10a illustrate exemplary tensioning devices 23a. The tensioning devices 23a may be adjusted until the vacuum chamber 5 is sealed by the thin film 10 along the top edge 1 and/or film mounting surface 11. Optionally, the tensioning devices 23a may be, for example, adapted for fixation to the first extender 13. Those skilled in the art will recognize that various types of designs of tensioning devices 23a may be applicable.

Similarly, as shown, a tensioning rod 22 may be positioned such that it can be used to force the thin film 10 towards the vacuum bottom edge 2. For example, the tensioning rod 22 may be positioned to force the thin film 10 into the first extender chamber 32 formed by the second extender 14 and vacuum chamber 5. Accordingly, the tensioning rod 22 may be positioned adjacent the vacuum chamber 5 and, more specifically, between the vacuum bottom edge 2 and the second extender edge 9. Alternatively, the tensioning rod 22 may be positioned between the vacuum bottom edge 2 and vacuum top edge 1, or the tensioning rod 22 may be positioned directly in line with the vacuum bottom edge 2.

Figure 8:
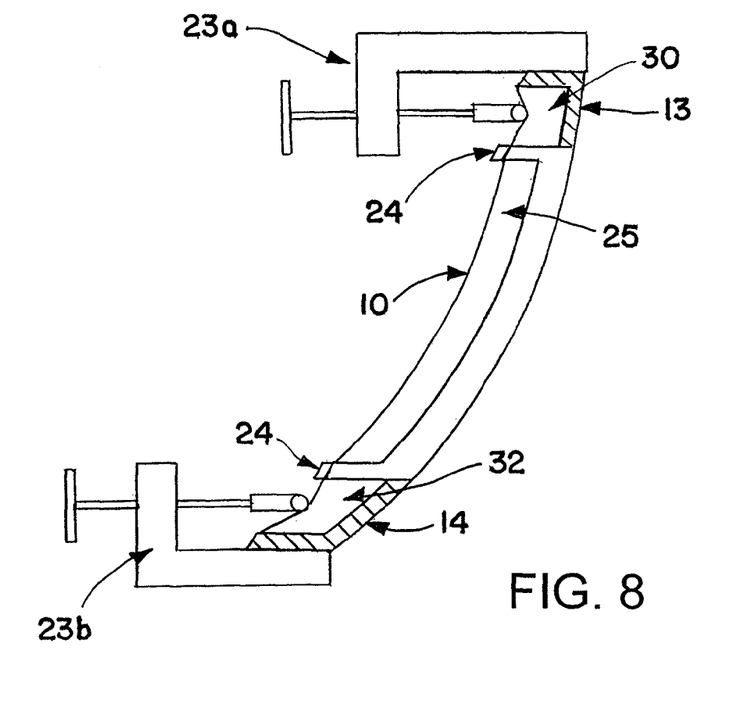
FIG. 8 illustrates a cross-section view of the apparatus of FIG. 7 where the thin film is subjected to a partial vacuum.
Figure 10A:
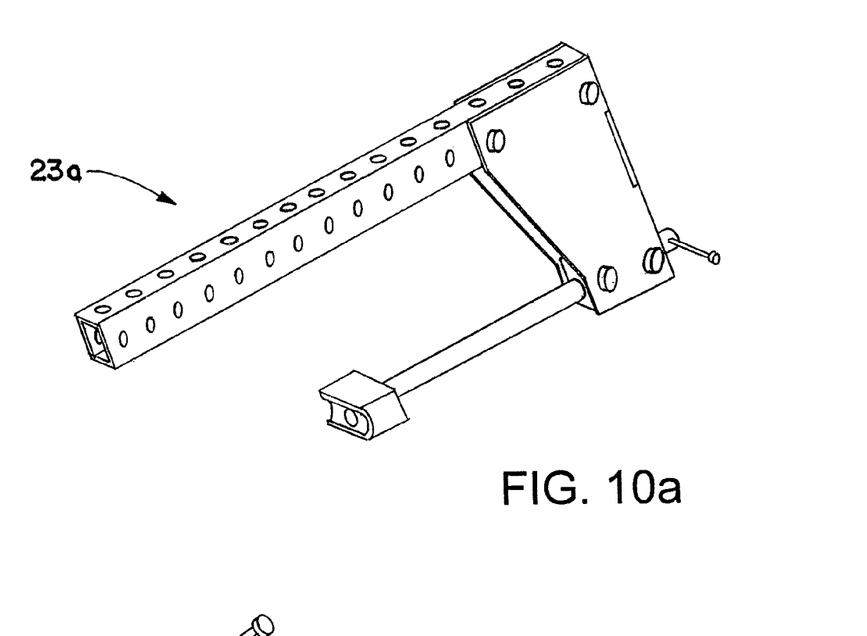
FIGS. 10a-b illustrate exemplary tensioning devices.
Figure 10B:
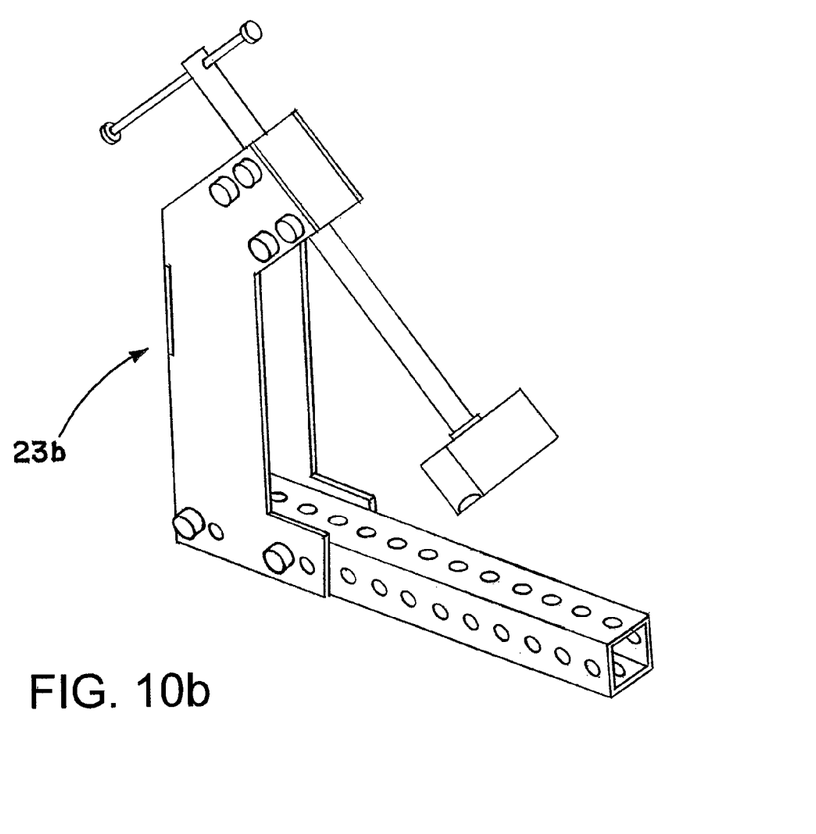

A plurality of tensioning devices 23b may be used to apply force to the rod 22, thereby causing the rod 22 to apply force to the thin film 10. FIGS. 7, 8 and 10b illustrate exemplary tensioning devices 23b. The tensioning devices 23b may be adjusted until the vacuum chamber 5 is sealed by the thin film 10 along the bottom edge and/or 2 film mounting surface 12. Optionally, the tensioning devices 23b may be, for example, adapted for fixation to the second extender 14. Those skilled in the art will recognize that various types of designs of tensioning devices 23b may be applicable.

In addition, it may be desirable to adjust the tensioning devices 23a-b to cause the thin film 10 to be sealed along the film mount surface extensions 18 and 19, and along surface 20 of the skinning attachment. FIG. 7 illustrates a cross-sectional view of such a seal.

Figure 4:
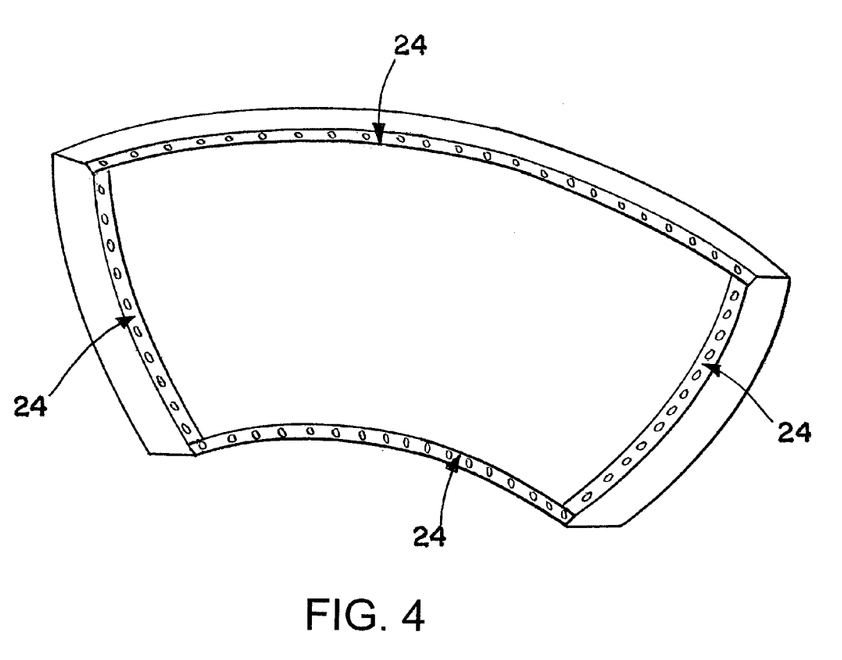
FIG. 4 illustrates a vacuum chamber having clamps securing a thin film to edges of the vacuum chamber.
Figure 9:
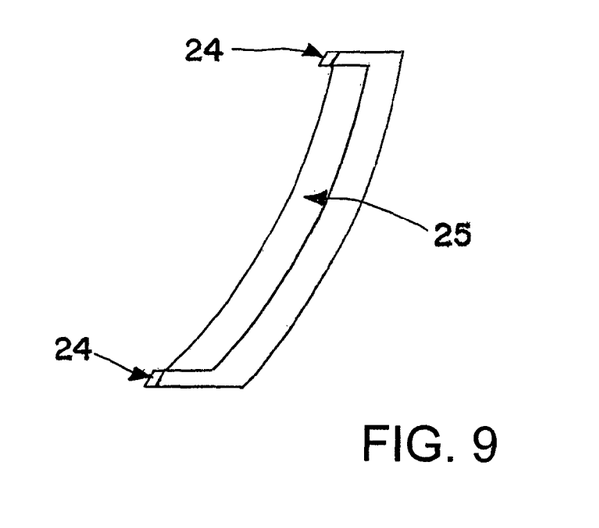
FIG. 9 illustrates a cross-section view of the apparatus of FIG. 4.

After sealing the vacuum chamber 5 a partial vacuum 25 may be applied. FIG. 8 illustrates the reshaping of the thin film 10 into a curve as a result of the partial vacuum 25. As shown in FIGS. 4 and 9, once the thin film 10 has obtained its desired shape, clamps 24 may be used to secure the thin film 10 to the vacuum edges 1, 2, 3, and 4. For example, the thin film 10 may be clamped 24 along the film mounting surfaces 6, 7, 11 and 12. In one embodiment, the thin film 10 is clamped 24 along all four vacuum edges 1, 2, 3, and 4. Using the clamps 24, the mirror may be permanently sealed and the patterns on the thin film 10 created by the tensioning rods 21 and 22 and tensioning devices 23a-b may be locked. Once clamped 24, the first extension 13, the second extension 14, the tensioning rods 21 and 22, and the tensioning devices 23a-b may be removed and excess thin film 10 may be trimmed.

It should be understood by those skilled in the art that changing and moving the positions of the edges of the extenders and/or radii provides control over the stress patterns in the thin film 10 along both the tangential and perpendicular directions to the vacuum edges 1 and 2. Accordingly, it may be desirable to utilize extenders that have edges that are adjustable with respect to the remainder of the extender. Additional control over the stress patterns in the thin film 10 perpendicular to the vacuum edges 1 and 2 may be achieved through the tensioning devices 23a-b, which can be utilized to spatially vary the stress patterns along the vacuum edges 1 and 2. As should be understood, similar control over stress patterns by adjusting the positions of the edges of the extenders with respect to the vacuum chamber.

Although the invention has been shown and described with respect to a certain preferred embodiment or embodiments, it is obvious that equivalent alterations and modifications will occur to others skilled in the art upon the reading and understanding of this specification and the drawings. In particular, in regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent). In addition, while a particular feature of the invention may have been described above with respect to only one or more of several illustrated embodiments, such feature may be combined with one or more other features of the other embodiments, as may be desired and advantageous for any given or particular application.

The invention claimed is:

1. An apparatus for constructing a thin film mirror comprising:
    a vacuum chamber having a top edge and a bottom edge;
    a first extender having an edge generally adjacent the vacuum chamber, the first extender edge and the vacuum chamber top edge being spaced apart along their respective lengths with the first extender edge extending beyond the top edge of the vacuum chamber;
    a second extender having an edge opposing the first extender and generally adjacent the bottom edge of the vacuum chamber, the second extender edge and the bottom edge of the vacuum chamber being spaced apart along their respective lengths with the second extender edge extending beyond the bottom edge of the vacuum chamber;

wherein the first extender edge and the second extender edge are positioned such that a thin film extending from the first extender edge to the second extender edge would not intersect the top edge and bottom edge of the vacuum chamber.

2. The apparatus of claim 1 wherein at least one of the first extender or the second extender has a generally L-shaped cross section such that when placed adjacent the vacuum chamber, the combination of the first extender or the second extender and the vacuum chamber has a generally U-shaped cross-section.

3. The apparatus of claim 1 wherein the end of at least one of the first extender or the second extender is not sealed.

4. The apparatus of claim 1 wherein a sealed chamber is formed by the first extender and the vacuum chamber.

5. The apparatus of claim 1 wherein each of the first extender edge and the second extender edge includes a generally flat mounting surface for mounting the thin film.

6. The apparatus of claim 1 wherein the first extender edge is adjustable with respect to the remainder of the first extender or the second extender edge is adjustable with respect to the remainder of the second extender.

7. The apparatus of claim 1 wherein each of the first extender and the second extender is structurally rigid.

8. The apparatus of claim 1 further comprising at least one tensioning rod adjacent the vacuum chamber.

9. The apparatus of claim 1 further comprising at least one tensioning rod between the top edge and the first extender edge or the bottom edge and the second extender edge.

10. The apparatus of claim 8 further comprising a plurality of tensioning devices adapted to apply force to the tensioning rod.

11. The apparatus of claim 9 wherein at least one of the plurality of tensioning devices is adapted for fixation to at least one of the first extender or the second extender.

12. The apparatus of claim 1 further comprising a skinning attachment positioned on the side of the vacuum chamber with respect to the orientation of the thin film mirror and adapted to mate with the vacuum chamber, the first extender and the second extender.

13. The apparatus of claim 12 wherein the skinning attachment comprises a first set of film mount surface extensions corresponding to the first extender edge and the second extender edge, and a second set of film mount surface extensions corresponding to a first vacuum chamber edge and a second vacuum chamber edge.

14. The apparatus of claim 1 wherein the first extender edge and the second extender edge are positioned along a generally circular arc.

15. The apparatus of claim 14 wherein the first extender edge, the top edge, the bottom edge, and the second extender edge are positioned along a generally circular arc.

16. The apparatus of claim 1 wherein the first extender edge and the second extender edge are positioned above and below the vacuum chamber with respect to the orientation of the thin film mirror.

17. The apparatus of claim 1 further comprising a clamp on the edge of the vacuum chamber adjacent the first extender or on the edge of the vacuum chamber adjacent the second extender.

18. A thin film mirror constructed using the apparatus of claim 1.

19. A method for constructing a thin film mirror comprising:
providing a vacuum chamber having a top edge and a bottom edge on opposing sides of the vacuum chamber;
providing an extender having an edge generally adjacent an adjacent edge of the vacuum chamber, the adjacent edge being at least one of the top edge or the bottom edge, the extender edge and the adjacent edge spaced apart along their respective lengths with the extender edge extending beyond the adjacent edge of the vacuum chamber such that a thin film extending from the extender edge to the top edge or bottom edge opposite the adjacent edge passes over and does not intersect the adjacent edge;
securing the thin film to the extender edge; and
applying force to the thin film between the extender edge and the adjacent edge sufficient to bring the thin film into contact with the adjacent edge.

20. The method of claim 19 further comprising providing a second extender having an edge generally adjacent an opposite adjacent edge, the opposite adjacent edge being the top edge or the bottom edge opposite the adjacent edge, the second extender edge and the opposite adjacent edge being spaced apart along their respective lengths and the second extender edge extending beyond the opposite adjacent edge of the vacuum chamber such that a thin film extending from the extender edge to the second extender edge would not intersect the top edge or the bottom edge of the vacuum chamber.

21. The method of claim 20 further comprising securing the thin film to the second extender edge.

22. The method of claim 19, wherein a sealed chamber is formed by the vacuum chamber and the extender, and wherein applying force to the thin film comprises applying a partial vacuum to the chamber formed by the vacuum chamber and the extender.

23. The method of claim 19 wherein applying force to the thin film comprises using a tensioning rod.

24. The method of claim 19 further comprising using a plurality of tensioning devices to adjust the force of the tensioning rod on the thin film.

25. The method of claim 19 further comprising attaching a skinning attachment the side of the vacuum chamber with respect to the orientation of the thin film mirror such that the skinning attachment mates with the vacuum chamber and the extender.

26. The method of claim 19 further comprising applying a partial vacuum to the vacuum chamber.

27. The method of claim 26 further comprising using a plurality of tensioning devices to adjust the thin film after applying the partial vacuum.

28. The method of claim 19 further comprising clamping the thin film to the edge of vacuum chamber adjacent the extender edge.

29. A thin film mirror constructed using the method of claim 19.

* * * * *